INVENTOR
Wendell L. Erickson

United States Patent Office 2,913,657
Patented Nov. 17, 1959

2,913,657
TRANSISTOR CONTROL FOR LOAD TAP CHANGERS

Wendell L. Erickson, Portage Lake, Mich., assignor to Westinghouse Electric Corporation, East Pittsburgh, Pa., a corporation of Pennsylvania Application June 14, 1957, Serial No. 665,768

10 Claims. (Cl. 323—43.5)

This invention relates generally to tap changers and more particularly to control systems for tap changers utilizing static devices for performing the control operations.

The object of the invention is to provide a control system for tap changers in which the control operations from the reception of a signal to the delivery or non-delivery of an output is effected by the functioning of logic circuits and static elements.

The invention accordingly comprises the features of construction, combinations of elements, and arrangements of parts, which will be exemplified in the construction hereinafter set forth and the scope of the application of which will be indicated in the claims.

Figure 1A:
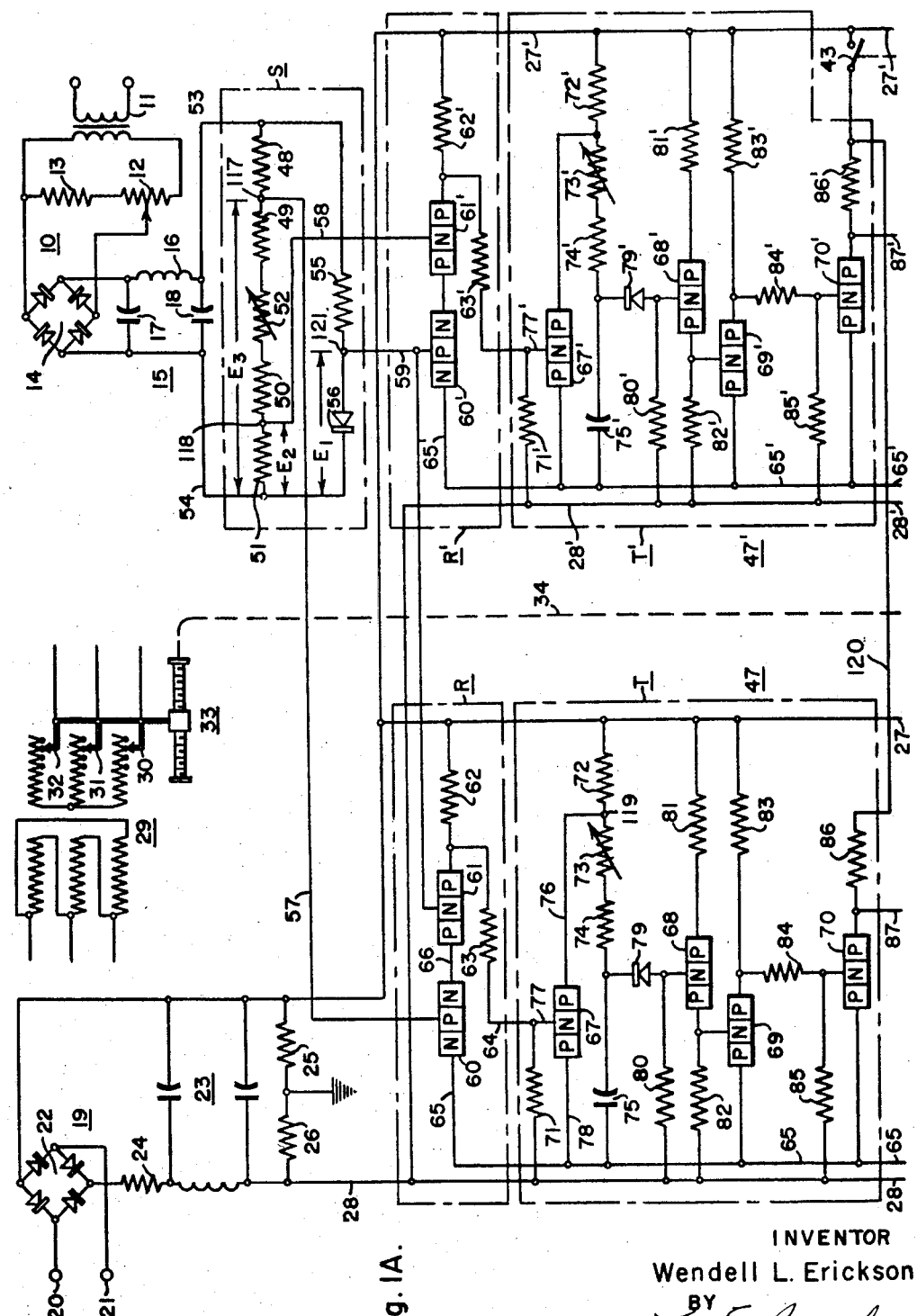
Figure 1B:
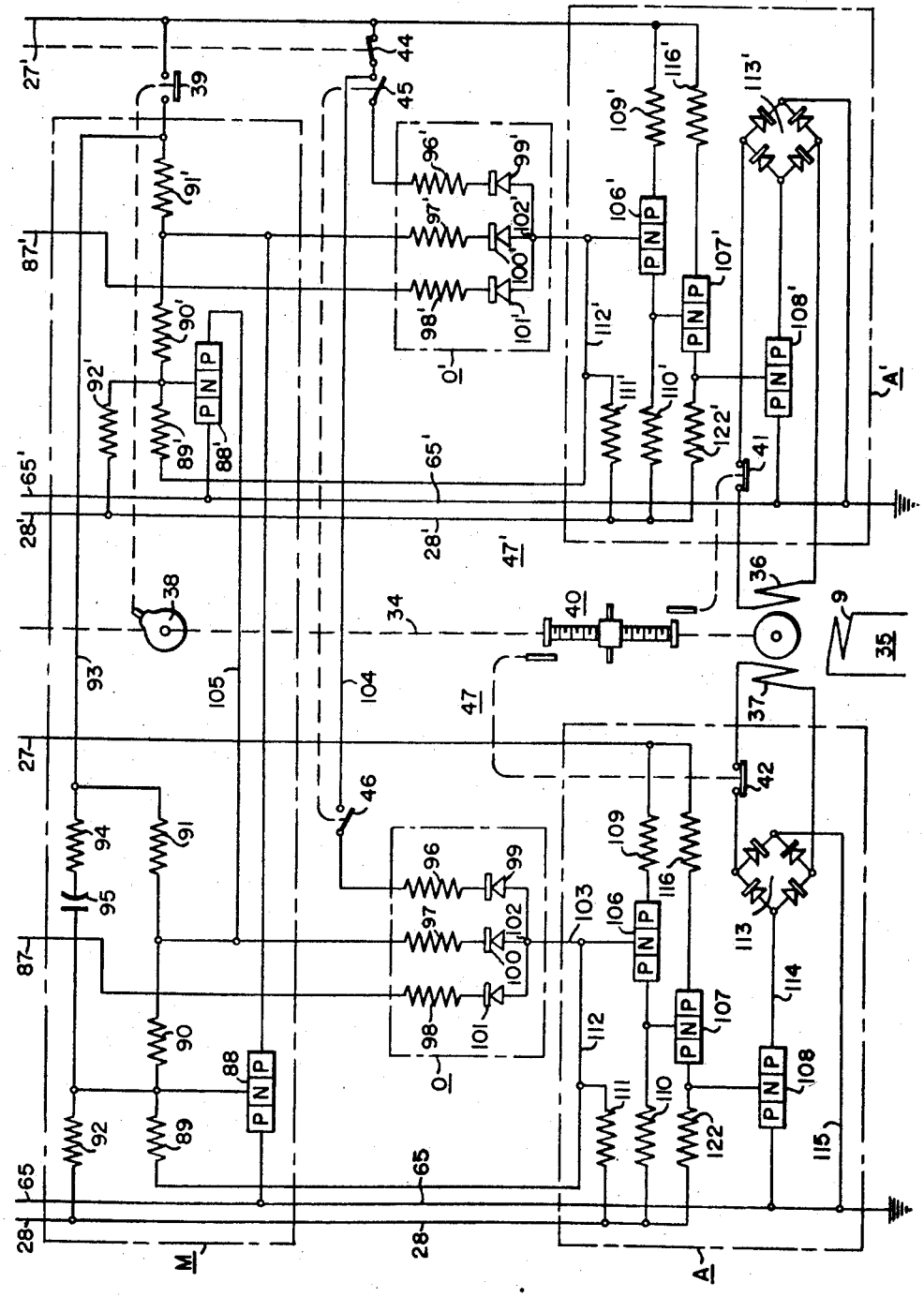

Fig. 1A and Fig. 1B comprise a diagrammatic showing of a control system giving the circuit connections and the relation of the elements and parts required for this embodiment of the invention.

Referring now to the drawing, 10 designates generally a monitoring system connected to a voltage source that it is desired to regulate or control. It is common to use a tap changer to control or regulate the voltage of a transformer, a transmission system or the like.

In the monitoring system illustrated, an auxiliary transformer is connected across a supply transformer winding to transmit the voltage of a function of the voltage to be controlled. It is more usual to transmit a function of the voltage to be controlled.

In the illustration the secondary of the transformer 11 is connected across resistors 12 and 13. It will be observed that the resistor 12 is a variable type resistor and it may be adjusted to meet the operating conditions. The full wave rectifier shown generally at 14 is connected across the resistors 12 and 13. A filter shown generally at 15 and comprising an inductance 16, two capacitors 17 and 18 is connected to the full wave rectifier to smooth out the voltage delivered to the tap changer control system.

Monitoring systems of this kind are well known in the art and need not be described in any greater detail. Further, the adjustments necessary for monitoring systems of this type are well understood.

A voltage supply system shown generally at 19 is provided for supplying the control system which will be described hereinafter. The voltage supply system 19 is connected to 120 volt A.C. supply terminals 20 and 21. A full wave rectifier shown generally at 22 is connected across the line. Following the rectifier is a filter shown generally at 23 comprising an inductance and capacitance. In addition, a number of resistors 24, 25 and 26 are connected across the full wave rectifier 22 and in circuit relationship with the filter 23. The final result is that the line conductors 27 and 28 leading to the control system have a voltage of approximately —45 and +3, respectively, relative to the ground connection.

The foregoing voltage has been selected for this embodiment of the invention. However, it is to be understood that in order to meet the requirements of other tap changer designs the voltages may be established to suit the specifications of the system.

The tap changer shown generally at 29 is for a three-phase system. The fingers 30, 31 and 32 may be moved in both directions. When moved in one direction they will effect an increase of the voltage and when moved in the opposite direction will cause a decrease in the voltage. Thus, if the voltage monitored through the monitoring system shown generally at 10 indicates that the voltage has increased, the control system to be described hereinafter will function to cause an operation of the tap changer to lower the voltage. If the monitoring system shown generally at 10 indicates that the voltage has dropped, the tap changer will function to bring about an increase in the voltage in order to maintain the voltage of the source within a predetermined voltage range.

The fingers 30, 31 and 32 may be actuated by any of the well known tap changer mechanisms to raise or lower the voltage of the voltage source. In the diagram, a screw and nut mechanism shown generally at 33 indicates a suitable mechanism for moving the tap changer fingers.

The screw and nut mechanisms shown generally at 33 will be actuated by a shaft 34 driven by the motor shown generally at 35. The motor 35 will be any of the well known types of motors employed for driving tap changers and may be supplied from any 120 volt alternating current power source (not shown). In the diagrammatic showing the motor 35 may be of the shaded-pole type, including an auxiliary shaded-pole winding 36 which cooperates with a main winding 9 in driving the motor 35 in a direction to actuate the tap changer to raise the voltage while the auxiliary shaded-pole winding 37 is connected to cooperate with the main winding 9 in driving the motor in the opposite direction to operate the tap changer to effect the lowering of the voltage. The motor 35 responds to the short circuiting of the auxiliary windings 36 and 37 by means of a rectifier-transistor combination which will be described hereinafter. The power supply for driving the motor is delivered to the main winding 9 from a source (not shown) of alternating current.

A cam 38 is provided on the shaft 34 for actuating a switch 39. The function of the switch 39 will appear when a description of how the tap changer is kept in operation to assure movement of the fingers 30, 31 and 32 from one position to another so that the tap changer will not remain stopped between tap changer positions.

Another nut and screw mechanism shown generally at 40 is provided for interrupting the operation of the tap changer motor shown generally at 35 when the tap changer reaches the limits of its movement. When the tap changer has reached the limit of its movement for the raising of the voltage, a switch 41 is opened. When it reaches the limit of its movement for lowering the voltage the switch 42 is operated. Mechanisms ordinarily employed for operating limit switches may be substituted for the screw and nut mechanism 40. These limit switches are well known in the art and a detailed description of them is deemed unnecessary.

In order to set the tap changer mechanism in operation, both automatic and manual switches are employed. In the embodiment of the invention illustrated, the automatic switch 43 is so connected in the control system that when it is closed the tap changer will proceed with its automatic operation. The automatic switch 43 is so connected to the manual switch 44 that when one is closed the other is opened. The manual switch 44 enables an operator to take over the operation of the tap changer at any time.

In order to enable an operator to manually operate the control system to raise or lower the voltage, two other switches 45 and 46 which are mechanically connected together are employed. Thus, if the operator is desirous of raising the voltage he will close the manual switch 44 and then operate the manual switch 45. When the manual switch 44 is closed, then the control system will go through the necessary cycle to bring about the raising of the voltage at the voltage source. When it is desired to cause a lowering of the voltage at the voltage source, the switch 46 will be closed assuring the opening of the switch 45. Now upon the closure of switch 46 if the manual switch 44 stands in the closed position there will be an operating cycle of the control system that will effect a lowering of the voltage at the output of the regulator.

The control system disposed between the monitoring system shown generally at 10 and the motor 35 which actuates the tap changer in either direction comprises two substantially similar units which will be designated generally as 47 and 47'. The control unit 47 will function to effect a lowering of the voltage when it receives a signal from the monitoring system that the voltage source to be controlled has been raised above rated value, while the control unit 47' will function to effect a raising of the voltage at the source when the monitoring system has delivered a signal indicating that the voltage source has dropped below rated value. Since the control units 47 and 47' are substantially the same, corresponding elements will be given the same legend, with the exception that the legend applied to the upper section 47' will be followed by an additional legend ' (prime).

A sensing or measuring circuit system, shown generally at S, is connected between the monitoring circuit system 10 and the control units 47 and 47'. The sensing or measuring circuit system comprises five resistor units 48, 49, 50 and 51, which are all units having a fixed ohmic resistance and a variable resistor 52. The resistors 48 to 52 inclusive are connected in series circuit relationship and across the filter shown generally at 15 by conductors 53 and 54. The ohmic value of resistance of each of the resistors 40 to 52 inclusive are dependent on the conditions to be met and can be readily selected by one skilled in the art since such sensing devices have been employed heretofore. Another resistor 55 is connected in series circuit relationship with a Zener diode 56. The resistor 55 and the Zener diode 56 connected in series circuit relationship are connected across the resistors 48 to 52 inclusive.

A conductor or lead 57 is connected to the junction between resistor 49 and the resistor 48. Another lead or conductor 58 is connected to the junction or common terminal between the resistors 50 and 51. A third lead 59 is taken off from the junction between the Zener diode 56 and the resistor 55.

This sensing or measuring circuit S is actually a bridge with a floating terminal between the leads 57 and 58. In operation, the variable resistor 52 will be so adjusted that when the voltage source to be controlled is at a rated value, there will be substantially no signal delivered from the sensing or measuring device. The section of the bridge between the connections with the conductors 57 and 58 is in the nature of a dead band and it has been found that in a control system of this kind it gives a sensitive measuring circuit for delivering signals to the control units to be described hereinafter.

The sensing or measuring circuit system S is connected through the leads 57 to 59, inclusive, to over and under circuit systems shown generally at R and R', respectively. These over and under circuit systems receive signals from the sensing circuit system S and function to set the control units 47 or 47' in operation. When the voltage to be controlled stands at rated value, substantially no signals will be delivered from the sensing or measuring circuit system S and the over and under circuit systems R and R' will perform no function other than to retain a predetermined stability in the control units 47 and 47' and they stand ready to respond to any signal received from the sensing systems.

The circuit systems R and R' and the other parts of the control units 47 and 47' to be described hereinafter are made up of transistors, resistors, capacitors and Zener diodes. The transistors will be either of the PNP or NPN type. When the transistor is of the NPN type the base will be the P element and the emitter and collectors the N elements. When the transistor is of the PNP type, the base will be the N element and the emitter and collector the P elements. However, PNP and NPN transistors may be interchanged by making the proper changes in the current supply and biasing circuits.

The over circuit system R comprises two transistors, 60 and 61 and resistors 62 and 63 connected in circuit relationship as shown. The transistor 60 is an NPN type while the transistor 61 is a PNP unit. A resistor 62 is connected between the collector of the transistor 61 and the line 27 of the voltage supply for the control system. As pointed out hereinbefore, this line or conductor 27 is held at a negative value which in this particular embodiment of the invention is rated at —45 volts. Another resistor 63 is connected to the junction point between the transistor 61 and the resistor 62. A lead 64 is connected to the other end of a resistor 63. This lead 64 is connected to the next unit of the control system which will be described hereinafter. A lead 65 is connected to the collector of the transistor 60.

In order to provide for delivering a signal from the sensing or measuring device shown generally at S, to the under circuit system R the leads 57 and 59 are connected to the base connections of the transistors 60 and 61, respectively. Therefore, with the lead 66 extending between the transistor 60 and 61 each transistor has three leads connected to its three electrodes or terminals.

The next unit of the control unit 47 is for effecting a time delay in the operation of the control system. It is shown generally at T. The delay circuit system shown generally at T comprises Not logic circuits at the beginning and end with transistors, resistors, a Zener diode and a capacitor disposed between to cooperate in the performing of predetermined functions. As illustrated, the time delay circuit system comprises four PNP transistors 67, 68, 69 and 70. A resistor 71 is connected through a lead 64 to the resistor 63 of the over circuit system R. The other end of the resistor 71 is connected to the line 28 of the supply system shown generally at 19. The base of the transistor 67 is connected through conductor 77 to the junction between the resistors 63 and 71. Three resistors, 72, 73 and 74 and a capacitor 75 are connected in series circuit relationship and between the supply line 27 and the lead 65 which is connected to the collector of the transistor 60. This lead 65 is a common lead to a number of the elements of the time delay circuit system T. The collector of transistor 67 is connected through conductor 76 to the junction between resistors 72 and 73. The emitter of transistor 67 is connected to lead 65 through conductor 78.

The Zener diode 79 is connected to the junction between the resistor 74 and capacitor 75. The other terminal of the Zener diode 79 is connected to the base of the transistor 68. The emitter of transistor 68 is connected to the base of transistor 69 and resistor 82 is connected between the base of transistor 69 and line 28. Therefore, transistor 68 supplies current to transistor 69. The resistor 81 is connected between the collector of transistor 68 and line 27 while resistor 82 is connected between the emitter of transistor 68 and line 28. The resistors 81 and 82 cooperate in biasing circuits. A resistor 83 is connected in series circuit relationship with the transistor 69 and the two series connected members between the supply line 27 and the lead 65. The emitter of transistor 68 is connected to the base of transistor 69. The base of the transistor 70 is connected through a resistor 84 to the junction point between the transistor 69 and the resistor 83. The junction point between the resistor 84 and the base of transistor 70 is connected through resistor 85 to the supply line 28. A resistor 86 is connected between the collector of the transistor 70 and one terminal of the automatic switch 43. The functioning of the time delay circuit system will be described in detail in describing the function of the control unit 47.

A lead 87 is connected to the junction between the resistor 86 and the transistor 70. This lead extends forward to an OR logic circuit which will be described hereinafter.

The next part of the control unit 47 is the voltage lower part of the memory logic circuit system shown generally at M. It comprises a PNP transistor 88 connected through a plurality of resistors to other elements of the control system to perform a memory function. There is another part of the memory logic circuit in the voltage raise control unit 47'.

In this embodiment of the invention, the memory logic circuit system M functions in conjunction with the cam operated switch 39. Therefore, it is so connected that it will be rendered active when the switch 39 is closed and inactive when the switch is open.

As shown, three resistors 89, 90 and 91 are connected in series circuit relationship. The upper terminal of resistor 91 is connected through conductor 93 to a junction point just below the switch 39. The lower terminal of resistor 89 is connected to the main terminal of the OR circuit to be described hereinafter. The terminal junction between the resistors 89 and 90 is connected to the upper terminal of resistor 92 while the lower terminal of resistor 92 is connected to the line 28. Thus, the three resistors 92, 90 and 91 connected in series circuit relationship may be connected between the lines 27 and 28 of the control supply source or the resistors 89, 90 and 91 connected in series circuit relationship may be connected between the line 27 and the output terminal of the OR circuit O by the closing of switch 39. The terminal between resistors 89 and 90 is connected to the base of transistor 88 as shown. The collector of transistor 88 is connected to the resistor 97' of the OR circuit O' and the emitter to the line or lead 65.

The lower section of the memory element M has an additional unit connected in circuit relationship therewith. It comprises a resistor 94 and a capacitor 95 connected in series circuit relationship and between one terminal of switch 39 and the base of transistor 88. This resistor and capacitor combination 94 and 95 respectively is also connected to the conductor 93 and the upper terminal of the resistor 92. The function of the resistor 94 and capacitor 95 will be explained when the operation of the system is described hereinafter.

In the embodiment of the invention illustrated, an OR logic circuit system shown generally at O is provided and connected to both the time delay element and the memory element of the control system.

This particular OR circuit system O comprises three resistors 96, 97 and 98 and three diodes 99, 100 and 101. The three resistors and three diodes are connected in series circuit relationship as shown. The three series connected combinations of resistors and diodes are connected to a common terminal 102. A lead 103 is connected to the common terminal 102. The resistor 96 and diode 99 and switch 46 connected in series circuit relationship are connected through a conductor 104 to a terminal between the manually operated switches 44 and 45. The resistor 97 and diode 100 connected in series circuit relationship are connected through a conductor 105 to the collector of the transistor 88' and also to the junction terminal between the resistors 90 and 91. The resistor 98 and diode 101 connected in series circuit relationship are connected to the lead 87 extending from the collector of the transistor 70. In this manner, the OR logic circuit O is connected to receive a signal from the time delay circuit system T or from the memory circuit unit M or from one of the manually operated switches 45 or 46 if one of switches 43 or 44 is closed in proper sequence.

In addition to the foregoing, the control system for the tap changer comprises an amplifier circuit system designated generally at A. The amplifier circuit system shown generally at A comprises three transistors 106, 107 and 108. They are connected in cascade relationship to give the required current gain to perform a function that will appear hereinafter. The transistor 106 is connected between two resistors 109 and 110. The upper terminal of resistor 110 is connected to the emitter of transistor 106 while the lower terminal of resistor 109 is connected to the collector. Thus, the resistor 109, transistor 106 and resistor 110 are connected in series circuit relationship and between the lines 27 and 28 of the control supply system.

A resistor 111 is connected through the conductor 112 to the main terminal 102 of the OR circuit system O and to the line conductor 28. The transistor 107 is connected in series circuit relationship with resistors 122 and 116 which are disposed on opposite sides of the transistor and the group of elements are connected across the lines 27 and 28 of the power source for the control system. Further, the base of transistor 107 is connected to the emitter of transistor 106. The emitter of transistor 107 is connected to the base of transistor 108.

A full wave rectifier shown generally at 113 is connected between the transistor 108 and the winding 37 of the motor shown generally at 35. The rectifier 113 may be of any well known type and need not be described in detail. It is sufficient to point out that one direct current terminal of the full wave rectifier is connected through conductor 114 to the collector of transistor 108 while the opposite (positive) terminal is connected through conductor 115 to the emitter of transistor 108. This latter connection through conductor 115 also is connected to the lead 65 described hereinbefore.

It will be appreciated that all the resistors, transistors, capacitors and diodes described hereinbefore will be designed in accordance with well known practice to have the right capacity for the functions to be performed.

In describing the operation of the control system, it will be first assumed that the voltage of the line to be controlled is standing at rated value. Under such a condition in the sensing circuit system S, the difference between the voltages of the sensing points at the terminals 117 and 118 and the voltage of the reference point 121 is not sufficient to cause the transistors 60 and 61 or the transistors 60' and 61' to become highly conductive. Therefore, the voltage on the base elements of the transistors 60 and 61 of the under circuit system R will be such that the transistors 60 and 61 and the transistors 60' and 61' are substantially nonconductive or highly resistive.

When the transistors 60 and 61 are highly resistive, there will be a negative voltage impressed on the base of transistor 67 of the time delay circuit system T. This negative voltage is sufficient to drive transistor 67 to a highly conductive state. When the transistor 67 becomes highly conductive, the terminal 119 between resistors 72 and 73 is in effect grounded and the capacitor 75 short circuited through resistors 73 and 74.

Under such short circuited conditions the capacitor cannot be charged and if it carries a charge it will be completely discharged. The transistor 67 and its connections constitute a Not logic circuit. When there is no input there is an output and if there is an input there is no output. The functioning of this type of circuit is well known in the art.

Since the Zener diode 79 is not subjected to a breakdown voltage, there will be no signal drive to transistor 68 and it is highly nonconductive, offering a high resistance to current flow. Since transistor 68 has a high resistance value, transistor 69 does not get any base current and is subjected to a positive biasing voltage from the line 28 through resistor 82. Therefore, transistor 69, since it is of the PNP type, is highly nonconductive. The collector of transistor 69, since it is connected through resistor 83 to line 27, can rise negatively to a negative value determined by the resistors 83 and 84 of the control circuit system and a base current will flow through the transistor 70 of the time delay circuit system T. Therefore, the transistor 70 will be driven to a highly conducting state.

When transistor 70 is highly conductive it shorts its collector to ground. No signal can be delivered from transistor 70 when it is in this state. Since the junction terminal between the resistor 86 and the transistor 70 is grounded through the transistor, no signal will be delivered to the OR circuit system O through the conductor 87. The transistor 70 with its circuit connections are in effect a Not logic circuit system. When a Not circuit receives a signal there is no output. In this case, the transistor 70 receives a signal and there is no output. If it did not receive a signal, there would be an output.

Since the cam actuated switch 39 stands open when the tap changer 29 is an "on" position, no signal will be delivered to the OR circuit system O through conductor 93 and resistor 97. Further, since the tap changer is on automatic and the switch 43 stands closed, the switches 45 and 46 will stand open and no signal will be delivered to the OR circuit system through resistor 96 and diode 99.

When no signal is delivered to the OR circuit system through any of its input connections, no output signal will be given. Therefore, the transistor 106 will be subjected to a positive bias from line 28 through resistor 111 and conductor 112.

Since transistor 106 is of the PNP type, it will remain highly non-conductive. Further since transistor 107 receives no signal from transistor 106 but does receive a positive bias from the line 28 it remains highly non-conductive. In turn, the transistor 108 will receive a positive bias through resistor 122 from line 28 and it too will be highly non-conductive.

Under such conditions, not enough current will be permitted to flow through the full wave rectifier 113 and in the auxiliary motor winding 37 to start the motor 35. Similarly the transistor 108' will be highly nonconductive and insufficient current will flow in the auxiliary winding 36 to start the motor 35. Consequently, the tap changer will not operate.

Assume now that the supply voltage rises and becomes appreciably greater than rated value. Then the voltage from the lower terminal of the resistor 51 to the junction at the upper end of resistor 49 and the lower end of resistor 48 also identified as 117 and which we have indicated as $E_3$ becomes still more positive than the voltage from the lower terminal of the resistor 51 to the lower terminal of resistor 55 which is designated 121 and the voltage as $E_1$. Then, a negative voltage is imposed on the base of PNP transistor 61 and a positive voltage on the base of the NPN transistor 60. In this manner, both of the transistors 60 and 61 are driven to a highly conductive state.

When the transistors 60 and 61 are highly conductive, the collector terminal of transistor 61 is in effect connected to ground and there is no input signal to transistor 67. When there is no input signal to transistor 67 of the time delay circuit system T, it becomes highly nonconductive and the terminal 119 has a higher negative voltage imposed on it than the lower terminal of the resistor 74, and the capacitor 75 will begin charging. The charging process occurs through the resistors 74, 73 and 72. This charging will continue until the Zener diode 79 breaks down. The breakdown of the Zener diode results from a predetermined voltage impressed across it.

The breakdown of the Zener diode 79 allows current to flow through the base of the transistor 68. The flow of base current through transistor 68 causes a certain current gain with the result that the emitter current becomes higher than the base current. This emitter current is drawn through the base of transistor 69. The transistor 69 adds to the current gain. The transistors 68 and 69 become highly conductive and the collector of transistor 69 is in effect connected to ground. Consequently, there is no signal to the transistor 70 and it stands highly nonconductive. Where the transistor 70 offers a high ohmic resistance, there is a negative voltage imposed on the collector of transistor 70 through conductor 120 and resistor 86 from the negative line 27' of the voltage supply system. Therefore, a signal from the time delay circuit system T is supplied through resistor 98, diode 101 of the OR logic circuit system O to the base of transistor 106. However, it is to be noted that the time delay circuit system has introduced a time element which is desirable to assure the operation of all the component part of the tap changer system in proper sequence. The length of the time interval may be varied within limits by design.

The base of transistor 106 is now subjected to a negative voltage with respect to the emitter and the transistor becomes highly conductive since it is of the PNP type. When the transistor 106 becomes highly conductive a negative voltage will be imposed on the base of the PNP transistor 107 rendering it highly conductive. The next step is that a negative voltage will be imposed on the PNP transistor 108 and it will become highly conductive. Each of the transistors 106, 107 and 108 as they become highly conductive, add to the current gain. Finally, transistor 108 is sufficiently conductive to substantially short-circuit the direct current terminals of the full wave rectifier 113 so that enough current flows through rectifier bridge 113 in the auxiliary winding 37 of the tap changer motor 35 to start the motor 35.

The tap changer motor 35 will now be driven in the direction required to drive the tap changer to lower the voltage of the voltage source to be regulated. The operation of the tap changer will be effected through the shaft 34.

When the tap changer motor rotates it will rotate the cam 38 and the switch 39 will close. The switch 39 will remain closed until the tap changer reaches its next position when the cam 38 will permit the switch 39 to open.

The closing of the switch 39 applies a negative voltage supply to the collectors of the PNP transistors 88 and 88' of the memory logic circuit system M through resistors 91' and 91, respectively. Since there is a voltage applied to the base of transistor 88 through resistor 89 and lead 112 from point 102 the output of the OR circuit system O, the transistor 88 becomes highly conductive and in effect grounds the lower terminal of the resistor 91'. Therefore, the transistor 88' is highly nonconductive. A signal now is delivered from the collector of transistor 88' through the resistor 97 and diode 100 of the OR circuit system O.

Assuming now that the tap changer 29 in its movement was between two positions and that the voltage of the power source reaches its rated value. Immediately the sensing device would respond to the balanced condition and would not impose a positive voltage on the transistor 60 and a negative voltage on the transistor 61 driving both of them to a highly conductive state. The signal having its origin with these transistors would fail and there would no longer be an input signal to the OR logic circuit system through the resistor 98 and the biode 101. If it were not for the memory circuit, the tap changer could remain in this intermediate zone.

The memory circuit system M now stands enerziged through the cam operated switch 39 and even though no signal is delivered through conductor 87 into the OR logic circuit system O, a signal will be delivered from the collector of transistor 88' through the conductor 105 to the resistor 97 and diode 100 of the OR circuit system.

When there is an input to the OR circuit system O there is an output and the transistors 106, 107 and 108 will all be driven to a highly conductive state and current will flow in the auxiliary winding 37 of the tap changer motor 35 in the manner described hereinbefore. The tap changer will be moved forward until it reaches the next position in the forward direction when the cam operated switch 39 will be opened.

Assume now that the voltage supply on the control system failed when the tap changer has moved to a point between two positions as it operates to raise the voltage of the power source which is monitored into the sensing circuit system S. This would render the memory circuit system M described hereinbefore ineffective and some other means are required to assure that the tap changer, when the power is restored, will operate in the lower direction and continue in that direction until the next position in the lower direction is reached.

It will be observed that resistor 94 and capacitor 95 are connected through switch 39 between the supply line 27' and the base of transistor 88. When the tap changer switch stood closed the capacitor 95 was charged. Now upon the failure of power and the wiping out of the circuit system set up through the signals resulting from the functioning of the sensing circuit system S, there is no means for causing the motor 35 to operate in the preferred lower direction to move the tap changer to the next position. Upon restoration of the power supply, the capacitor 95 will conduct a pulse of current and deliver a signal to the base of transistor 88 to cause the memory circuit M to assume a state with transistor 88 highly conductive and 88' highly resistive, thus delivering the desired signal through the OR circuit O, resistor 97 and diode 100. The transistors 106, 107 and 108 are all rendered conducting in the order named to substantially short-circuit the direct current terminals of the full wave rectifier 113 and sufficient current then flows in the auxiliary winding 37 of the tap changer motor 35 causing the motor 35 to drive the tap changer into the next tap changer position and lower the voltage.

Assume now that the voltage to be controlled drops below its rated value. The voltage monitored through circuit system 10 to the sensing device S will be lower than rated value. Then voltages $E_2$ and $E_1$ will be applied to the transistors 60' and 61'. The voltage $E_2$ is the voltage across resistor 51. It is indicated in the diagram by $E_2$. The result is that a negative voltage is applied to the base of the transistor 61' and a positive voltage to the base of transistor 60'. The transistors 60' and 61' are driven to a highly conductive state. The collector of transistor 61' is in effect connected to ground and no voltage is imposed on the base of transistor 67'. Therefore, the transistor 67' is highly nonconductive and the capacitor 75' may now be charged. The charging of the capacitor 75' is effected through the resistor 72', the variable resistor 73' and the resistor 74' all connected in series circuit relationship.

At some point in the charging of the capacitor 75' a voltage will be impressed across the Zener diode 79' which causes it to break down. The breakdown of the diode 79' allows current to flow through the base of the transistor 68'. The flow of current through the transistor 68' causes current amplification and the transistor 69' is also driven to a highly conductive state with the result that there is a further current amplification of current gain. The collector of transistor 69' is in effect grounded to line 65'.

There is now no voltage signal through the resistors 83' and 84' to transistor 70' causing the transistor 70' to be highly resistive and a voltage signal is applied through resistor 86' to the resistor 98' and diode 101' of the OR circuit system O'. Thus, with an input to the R' circuit system after the introduced time delay there is an output from the OR circuit and the transistor 106' is driven to saturation and becomes highly conductive. This causes negative voltages to be imposed on the transistors 107' and 108' driving them to saturation and rendering them highly conductive. With the driving of each of the transistors 106', 107' and 108' to saturation, there is a large current gain. Finally, transistor 108' is sufficiently conductive to substantially short-circuit the direct current terminals of the full wave rectifier 113' so that sufficient current flows through the full wave rectifier 113' in the auxiliary winding 36 of the motor 35 to set it in operation to drive the tap changer in the direction to raise the voltage.

If while between tap changer positions the voltage at the power source is corrected, then the sensing circuit S will be balanced and no voltage will be imposed on the transistors 60' and 61' and they will be in a highly nonconductive or resistant state as described hereinbefore.

The tap changer will not stop. However, the memory circuit M stands energized for raise operation and will function to deliver a signal to the OR circuit system O' through the resistor 97' and the diode 100'. The OR circuit system will continue to deliver an output which will continue to drive the transistors 106', 107' and 108' to the highly conductive state in the order named and a current will be delivered through the full wave rectifier 113' to the winding 36 of the motor 35 in the manner hereinbefore described. The motor will continue to drive the tap changer 29 in the lower direction until it reaches the next position.

If the power to the control system should fail and is restored, then the capacitor 95 will conduct a pulse of current and deliver a signal to the base of transistor 88 and cause the memory circuit M to assume a state, with the transistor 88 highly conductive and transistor 88' highly resistive, in which it delivers a signal through the OR circuit O, resistor 97 and diode 100. The OR circuit system delivers an output and drives the transistors 106, 107 and 108 to a highly conductive state as described hereinbefore. Therefore, on the restoration of the power, the motor will continue to drive the tap changer 29 in the lower direction to the next position.

An operator can take over the operation of the tap changer control system and through the manipulation of switches 44, 45 and 46 cause a movement of the tap changer in either direction. Assuming that it is desired to actuate the tap changer in the voltage raise direction, the operator will first close switch 44, then switch 45 and when these two switches are closed, a signal will be delivered through an OR circuit system through resistor 96' and diode 99'. An output will be delivered by the OR circuit system to the transistor 106' driving it to a highly conductive state. The transistors 107' and 108' will also be driven to highly conductive states in a manner hereinbefore described to substantially short-circuit the full wave rectifier 113' and sufficient current will flow through the full wave rectifier 113' and in the winding 36 of the motor 35. The tap changer would be operated to effect a raising of the voltage.

In order to lower the voltage, the operator would close switches 44 and 46. A signal will be delivered to the OR circuit system O through the resistor 96 and diode 99. The Or circuit system will then deliver an output to drive transistors 106, 107 and 108 to a highly conductive state. Current will then be permitted to flow through the full wave rectifier 113 and in the winding 37 of the motor 35. The tap changer will be operated in the voltage lower direction.

Since certain changes may be made in the above construction and different embodiments of the invention could be made without departing from the scope thereof, it is intended that all matter contained in the above description or shown in the accompanying drawing shall be interpreted as illustrative and not in a limiting sense.

I claim as my invention:

1. In a control system for tap changers which respond to changes of voltage to effect the operation of a motor to actuate the tap changer to compensate for the voltage change, in combination, a voltage measuring circuit for transmitting a function of a change in voltage, first means responsive to the voltage measuring circuit for delivering a signal, a time delay circuit system connected to the output of said first means for receiving the signal from the first means responsive to the measuring circuit, the time delay circuit system being capable of delivering an output signal after a predetermined time delay, an OR logic circuit connected to the output of the time delay circuit for receiving a signal from the time delay circuit and delivering an output, and second means connected to the output of said OR logic circuit for receiving the output from the OR circuit and actuating the motor.

2. In a control system for tap changers which respond to changes of voltage to effect the operation of a motor to actuate the tap changer from position to position to compensate for a voltage change, in combination, a voltage measuring circuit for transmitting a function of a change in voltage, first means responsive to the voltage measuring circuit for delivering a signal, a time delay circuit system for receiving the signal from the means responsive to the measuring circuit, the time delay circuit being capable of delivering an output signal after a predetermined time delay, an OR logic circuit connected to the output of said time delay circuit for receiving a current from the time delay circuit and delivering an output, second means connected to the output of said OR logic circuit for receiving the output from the OR circuit and actuating the motor, a switch disposed to be operated by the motor when the tap changer is disposed between positions, a memory logic circuit system disposed to be energized when the switch is operated by the motor, the memory circuit being connected to the input of said OR logic circuit to deliver an output to the OR logic circuit to assure an output from said OR logic circuit to said second means and to assure the continuance of the operation of the motor until the tap changer has been actuated from one position to the next.

3. In a control system for tap changers which respond to changes of voltage to effect the operation of a motor to actuate the tap changer from position to position to compensate for a voltage change, in combination, a voltage measuring circuit for transmitting a function of a change in voltage, means responsive to the voltage measuring circuit for delivering a signal, a time delay circuit system for receiving the signal from the means responsive to the measuring circuit, the time delay circuit being capable of delivering an output signal after a predetermined time interval, an OR logic circuit connected to the output of the time delay circuit for receiving a signal from the time delay circuit and delivering an output, first means connected to the output of said OR logic circuit for receiving the output from the OR circuit and actuating the motor, a switch disposed to be operated by the motor, a memory circuit disposed to be energized when the switch is closed by the motor when said tap changer is disposed between positions, the memory circuit being connected between said switch and the input of said OR logic circuit to deliver an output to the OR logic circuit to assure an output from said OR logic circuit to said first means and to assure the continuance of the operation of the motor until the tap changer has been actuated from one position to another, and second means connected to the memory circuit cooperating with said memory circuit to assure completion of the movement of the tap changer from one position to the next lower position if the power for the control system should fail before completion of a movement from one position to another and be reestablished when the tap changer is stopped between positions.

4. In a control system for a tap changer which responds to changes in voltage at a power source to effect the operation of a motor to actuate the tap changer from position to position to compensate for the voltage changes, in combination, a voltage source for the control system, a sensing circuit for measuring a function of the voltage changes at the power source, first means responsive to the voltage measurements of the sensing device for delivering an output signal, a time delay circuit system connected to the output of said first means for receiving the signal from the first means responsive to the sensing circuit, the time delay circuit being capable of delivering an output signal after a predetermined time interval, an OR logic circuit system connected to the output of the time delay circuit to receive a signal from the time delay circuit and deliver an output, an amplifying means connected between the output of the OR circuit and the motor for actuating the motor, and a tap changer actuated by the motor to move from position to position to regulate the voltage at the power source to a predetermined rated value.

5. In a control system for tap changers which respond to changes of voltage to effect the operation of a motor to actuate the tap changer from position to position to compensate for the voltage change, in combination, a voltage measuring circuit for transmitting a function of a change in voltage, first means responsive to the voltage measuring circuit for delivering a signal, a time delay circuit system connected to the output of said first means for receiving the signal from the means responsive to the measuring circuit, the time delay circuit system being capable of delivering an output signal after a predetermined time delay, an OR logic circuit system capable of delivering an output when it receives an input disposed to receive an input from the time delay circuit system and second means connected to the output of said OR logic circuit to be responsive to the output of the OR logic circuit system for actuating the tap changer motor to effect a predetermined operation of the tap changer from one position to another in the direction in which the movement was initiated.

6. In a control system for tap changers which respond to changes of voltage at a power source to effect the operation of a motor to actuate the tap changer from position to position to restore the voltage of the power source to rated value, in combination, a voltage measuring circuit for transmitting a function of the change in voltage of the power source, first means responsive to the voltage measuring circuit for delivering a signal, a time delay circuit system connected to the output of said first means for receiving the signal from the first means responsive to the voltage measuring circuit system, the time delay circuit system being capable of delivering an output signal after a predetermined time delay, an OR logic circuit system capable of delivering an output when it receives an input disposed to receive an input from the output of the time delay circuit system and second means connected to the output of the OR logic circuit to be responsive to the output of the OR logic circuit system for actuating the tap changer motor to effect a predetermined operation of the tap changer from one position to another to correct for the changes in voltage at the power source and third means connected to the input of the OR logic circuit to cooperate with the OR logic circuit system to assure an output from the OR logic circuit and to assure the continued operation in the same direction of the tap changer motor to effect a complete movement of the tap changer from one position to the next even though the voltage at the power source has been restored to rated value before the tap changer has completed its movement from one position to the next.

7. In a control system for tap changers which respond to changes of voltage at a power source to effect the operation of a motor to actuate the tap changer from position to position to correct for the changes in voltage at the power source, in combination, a voltage measuring circuit system for transmitting a function of a change in voltage at the power source, first means responsive to the voltage measuring circuit for delivering a signal, a time delay circuit system connected to the output of said first means for receiving the signal from the first means responsive to the voltage measuring circuit, the time delay circuit system being capable of delivering an output signal after a predetermined time interval, an OR logic circuit system capable of delivering an output when it receives an input disposed to receive an input from the output of the time delay circuit system, and second means connected to the output of said OR circuit to be responsive to the output of the OR logic circuit system for actuating the tap changer motor to effect a predetermined operation of the tap changer and third means connected to the input of the OR logic circuit to cooperate with the OR logic circuit system to assure an output from the OR logic circuit and to assure that the motor will continue the operation of the tap changer in a predetermined direction from one position to the next after a signal has been given from the first means that there has been a change in voltage at the power source.

8. In a control system for tap changers which respond to changes in voltage at a power source from rated value to effect the operation of a motor to actuate the tap changer from position to position to restore the voltage at the power source to rated value, in combination, a voltage measuring circuit system for transmitting a function of the change in voltage at the power source, first means responsive to the voltage measuring circuit system for delivering a signal, a time delay circuit system connected to the output of said first means for receiving the signal from the first means responsive to the measuring circuit, the time delay circuit system being capable of delivering an output signal after a predetermined time interval, an OR logic circuit system capable of delivering an output when it receives an input disposed to receive an input from the output of the time delay circuit system and second means responsive to the output of the OR logic circuit system for actuating the tap changer motor to effect a predetermined operation of the tap changer and a memory logic circuit connected to the input of said OR circuit to cooperate with the OR logic circuit system to assure an output from said OR circuit and to assure the continued operation of the tap changer motor to effect a complete movement of the tap changer from one position to the next in the direction in which movement is initiated even though the voltage at the power source has been restored to rated value before the tap changer has completed its movement from one position to the next and third means connected in circuit relation with said memory logic circuit to cooperate with the OR logic circuit system to assure an output from the OR logic circuit and to assure that the motor will continue the operation of the tap changer from one position to the next lower position after a failure of power for the control system and after the voltage of the power source has been restored to rated value.

9. In a control system for tap changers which respond to changes in voltage at a power source to effect the operation of a motor to actuate the tap changer from position to position to restore the voltage at the power source to rated value, in combination, a voltage measuring circuit for transmitting a function of the change in voltage at the power source, first means responsive to the voltage measuring circuit for delivering a signal, a time delay circuit system connected to the output of said first means for receiving signals from the first means responsive measuring circuit system, the time delay circuit system being capable of delivering an output signal after a predetermined time interval, an OR logic circuit system capable of delivering an output when it receives an input disposed to receive an input from the output of the time delay circuit system and second means responsive to the output of the OR logic circuit system for actuating the tap changer motor to effect a predetermined operation of the tap changer, a memory logic circuit system connected to the input of the OR logic circuit to cooperate with the OR logic circuit system to assure an output from the OR logic circuit to assure the continued operation of the tap changer motor to thereby effect a complete movement of the tap changer from one position to the next even though the voltage at the power source has been restored to rated value before the tap changer has completed its movement from one position to the next and third means connected in circuit relation with the memory logic circuit to cooperate with the OR logic circuit system to assure that the motor will continue the operation of the tap changer from one position to the next lower position after a failure of power for the control system and after the voltage at the power source has been restored to rated value when the tap changer has been started in its movement from one position to the next.

10. In a control system for a tap changer which responds to changes in voltage at the power source to effect the operation of a motor to actuate the tap changer from position to position for the purpose of restoring the voltage at the power source to rated value, in combination, first means for monitoring a change in voltage from a power source, a sensing circuit system connected to the monitoring circuit system for transmitting a function of the change in voltage at the power source, second means connected to said sensing circuit to be responsive to the voltage sensing circuit system for delivering a signal, a time delay circuit system connected to the output of said time delay circuit for receiving the signal from the second means responsive to the sensing circuit system, the time delay circuit system being capable of delivering an output signal after a predetermined time interval, an OR logic circuit connected to the output of the time delay circuit for receiving the output current from the time delay circuit system and delivering an output, and third means connected to the output of the OR logic circuit to be responsive to the output of the OR logic circuit system for actuating the tap changer motor to effect a predetermined operation of the tap changer, a memory logic circuit system connected to the input of the OR logic circuit to cooperate with the OR logic circuit system to assure an output from the OR logic circuit and to assure the continued operation of the tap changer motor to thereby effect a complete movement of the tap changer from one position to the next in the direction in which movement is initiated even though the voltage at the power source has been restored to rated capacity before the tap changer movement from one position to the next has been completed, and fourth means connected in circuit relation with said memory circuit to cooperate with the OR and memory circuit systems to assure an output from the OR logic circuit and to assure that the motor will continue the operation of the tap changer from one position to the next lower position after the tap changer has started a movement and the voltage at the power source has been restored to rated value and there has been a failure and restoration of the control power source.

References Cited in the file of this patent

UNITED STATES PATENTS 2,752,556    Webb et al.            June 26, 1956